(12) United States Patent
Park et al.

(10) Patent No.: US 7,892,685 B2
(45) Date of Patent: Feb. 22, 2011

(54) FUEL CELL SYSTEM

(75) Inventors: Myung-Seok Park, Gwangmyeong (KR); Yong-Jun Hwang, Seoul (KR); Seung-Tae Ko, Seoul (KR); Jung-Gyu Park, Seoul (KR); Seong-Geun Heo, Bucheon (KR); Ki-Dong Kim, Gimpo (KR); Tae-Won Kim, Anyang (KR); Sung-Nam Ryoo, Daejeon (KR); Sun-Hoe Kim, Seoul (KR); Bon-Gwan Gu, Seoul (KR); Hyung-Kyu Youk, Suwon (KR); Hyun-Jae Lee, Seoul (KR); Gil-Yong Lee, Seoul (KR); Jun-Seong Park, Seoul (KR); Sun-Gu Kwon, Bucheon (KR); Byung-Tak Park, Danyang-Gun (KR); Sang-Heon Lee, Uijeongbu (KR); Geun-Ho Jin, Seoul (KR)

(73) Assignee: LG Electronics Inc., Seoul (KR)

( * ) Notice: Subject to any disclaimer, the term of this patent is extended or adjusted under 35 U.S.C. 154(b) by 1097 days.

(21) Appl. No.: 11/608,541

(22) Filed: Dec. 8, 2006

(65) Prior Publication Data
US 2008/0044698 A1    Feb. 21, 2008

(30) Foreign Application Priority Data
Aug. 21, 2006 (KR) ............... 10-2006-0079068

(51) Int. Cl.
*H01M 8/04*   (2006.01)
*H01M 8/06*   (2006.01)
*H01M 10/50*  (2006.01)

(52) U.S. Cl. .................. 429/435; 429/400; 429/402; 429/403; 429/407; 429/408; 429/415; 429/416; 429/417; 429/428; 429/433; 429/434; 429/436; 429/437; 429/440; 429/441

(58) Field of Classification Search .................. None
See application file for complete search history.

(56) References Cited

U.S. PATENT DOCUMENTS

| 5,985,474 | A   | * | 11/1999 | Chen et al. ............... 429/410 |
| 7,138,199 | B2  | * | 11/2006 | Mohapatra ............... 429/437 |
| 2002/0146605 | A1 |  | 10/2002 | Nakanishi et al. |
| 2003/0232226 | A1 | * | 12/2003 | Morishima et al. ........ 429/24 |

(Continued)

FOREIGN PATENT DOCUMENTS

CN    1732585    2/2006

(Continued)

*Primary Examiner*—Melvin C Mayes
*Assistant Examiner*—Colin W Slifka
(74) *Attorney, Agent, or Firm*—Workmam Nydegger (57) ABSTRACT

A multi-unit fuel cell system that includes a common-use reforming unit configured to supply hydrogen to multiple fuel cell units that are installed in multiple units, such as apartments within an apartment building. In one example embodiment, a fuel cell system including a common-use reforming unit and multiple fuel cell units is disclosed. The common-use reforming unit is configured to supply hydrogen to the plurality of fuel cell units. Each fuel cell unit includes a stack unit, an air supplying unit, an integral heat exchange unit, a hot-water supplying unit, an auxiliary heat supplying unit, and an electric output unit.

20 Claims, 3 Drawing Sheets

U.S. PATENT DOCUMENTS

| | | | |
|---|---|---|---|
| 2004/0001984 A1* | 1/2004 | Alva | 429/26 |
| 2005/0214603 A1 | 9/2005 | Barton et al. | |
| 2006/0019134 A1 | 1/2006 | Yagi et al. | |
| 2006/0251937 A1* | 11/2006 | Inai et al. | 429/23 |

FOREIGN PATENT DOCUMENTS

| | | |
|---|---|---|
| JP | 2003-329332 | 11/2003 |

\* cited by examiner

FUEL CELL SYSTEM

CROSS-REFERENCE TO RELATED APPLICATIONS

The present disclosure claims the benefit of Korean Application No. 10-2006-0079068, filed on Aug. 21, 2006, which is hereby incorporated by reference in its entirety.

BACKGROUND OF THE INVENTION

1. Field of the Invention

The present invention relates to a fuel cell system for supplying electrical energy in a multi-unit environment. More particularly, embodiments of the present invention are directed to a fuel cell system that includes a common-use reforming unit configured to supply hydrogen to multiple fuel cell units.

2. Related Technology

The use of oil and other fossil fuels as an energy source has a number of drawbacks. For example, fossil fuels produce a number of harmful environmental pollutants. Further, the increasing demand for fossil fuels, especially during periods of high seasonal demand for heating and cooling, can cause fossil fuel prices to rise dramatically. Consequently, alternatives to fossil fuels that are lower cost and/or more environmentally friendly are increasingly important. One such alternative is the fuel cell.

A fuel cell is an energy conversion apparatus that is generally configured to directly convert chemical energy into electrical energy. For example, in a typical fuel cell operation, as a hydrogen-rich fuel and oxygen-rich air are supplied to the fuel cell a electrochemical reaction is generated between the supplied hydrogen and oxygen. The energy difference resulting from the pre-reaction and the post-reaction chemicals is then converted into the electrical energy. Accordingly, the fuel cell continuously generates electrical energy while being supplied with fuel and oxygen. The fuel cell also generates reaction heat and water as by-products.

There are various types of fuel cells that operate in this general fashion. For example, representative types of fuel cells include phosphoric acid fuel cells, alkaline fuel cells, proton exchange membrane fuel cells, molten carbonate fuel cells, solid oxide fuel cells, and direct methanol fuel cells.

Fuel cells can be used to generate electrical power in a wide variety of environments and applications. For example, fuel cells are used to generate electrical power for use in electric automobiles and other vehicles. Fuel cells are also used to supply power to homes, offices, and other dwellings. For example, a residential fuel cell can be used to supply electrical power to home appliances, lighting devices, and the like. Moreover, a fuel cell might be used to supplement the supply of electrical power by conventional means. For example, electrical energy produced by a residential fuel cell can supplement electrical energy produced by a conventional power plant.

The use of fuel cells to generate electrical power is not without problems or drawbacks however. For example, one drawback of using a fuel cell to generate electrical power in a residential environment (e.g., in an apartment building) is the physical space demands of a typical residential fuel cell system. Since the physical space occupied by the various components of a typical residential fuel cell system is not available for other uses, the use of such a system in many environments is not practicable. This is especially true in space-restricted environments, such as in apartment or condominium housing units, or in any environment where physical space is at a premium.

As such, it would be an advance in the art to provide a fuel cell system that is requires less physical space to implement. Preferably, such a system could be implemented in a multi-housing environment where space is at a premium—such as in an apartment or condominium complex and the like.

SUMMARY OF EXAMPLE EMBODIMENTS

Accordingly, embodiments of the present invention are directed to fuel cell systems that can be implemented in a manner that reduces the amount of physical space needed and that can be used, for example, in a multi-housing environment such as an apartment complex. For example, preferred embodiments include a common-use reforming unit that can be configured to supply hydrogen to multiple fuel cell units. As a result, each of the individual fuel cell units occupy a smaller physical space and can be easily installed, for example, in multiple apartment units or in any other environment having limited space.

As noted, in an example embodiment, a fuel cell system includes a common-use reforming unit and multiple fuel cell units. The common-use reforming unit is configured to supply, for example, hydrogen to the plurality of fuel cell units. While other configurations could be used, in an illustrated embodiment each fuel cell unit can include a stack unit, an air supplying unit, and an electric output unit. Depending on the needs of a particular application, the fuel cell unit might also include an integral heat exchange unit, a hot-water supplying unit, an auxiliary heat supplying unit. The stack unit is configured to generate electricity by an electrochemical reaction between air (or other oxygen rich substance) and the hydrogen supplied from the common-use reforming unit. The air supplying unit is configured to supply the air to the stack unit. The integral heat exchange unit is configured to cool the stack unit by recovering heat generated by the stack unit. The integral heat exchange unit is also configured to store the recovered heat. The hot-water supplying unit is configured to receive the heat stored by the integral heat exchange unit.

In certain embodiments, the hot-water supplying unit can also be configured to provide heat and hot water external to the fuel cell unit. The auxiliary heat supplying unit is configured to generate heat by reacting air supplied from the air supplying unit and hydrogen supplied from the common-use reforming unit or hydrogen discharged from the stack unit. The auxiliary heat supplying unit is also configured to selectively supply the generated heat to the hot-water supplying unit. The electric output unit is configured to convert the electricity generated in the stack unit into a utility power.

A fuel cell system of this type provides a number of advantages. First, since each individual fuel cell unit does not require the presence of a dedicated reformer to provide hydrogen (or other fuel), the overall physical size of the fuel cell unit is smaller. As such, the fuel cell unit can be much easier to implement in space constrained areas, such as an apartment or condominium. Moreover, the system can be implemented such that it provides both electrical and thermal energy. As such, the system can be used to provide electrical power, as well as heat for heating water and/or heating a dwelling.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of example embodiments of the invention and are incorporated in and constitute a part of this specification, disclose example embodiments of the invention and together with the description serve to explain the principles of the invention.

In the drawings.

DETAILED DESCRIPTION OF EXAMPLE EMBODIMENTS

Reference will now be made in detail to example embodiments of the present invention which are disclosed in the accompanying drawings.

Figure 1:
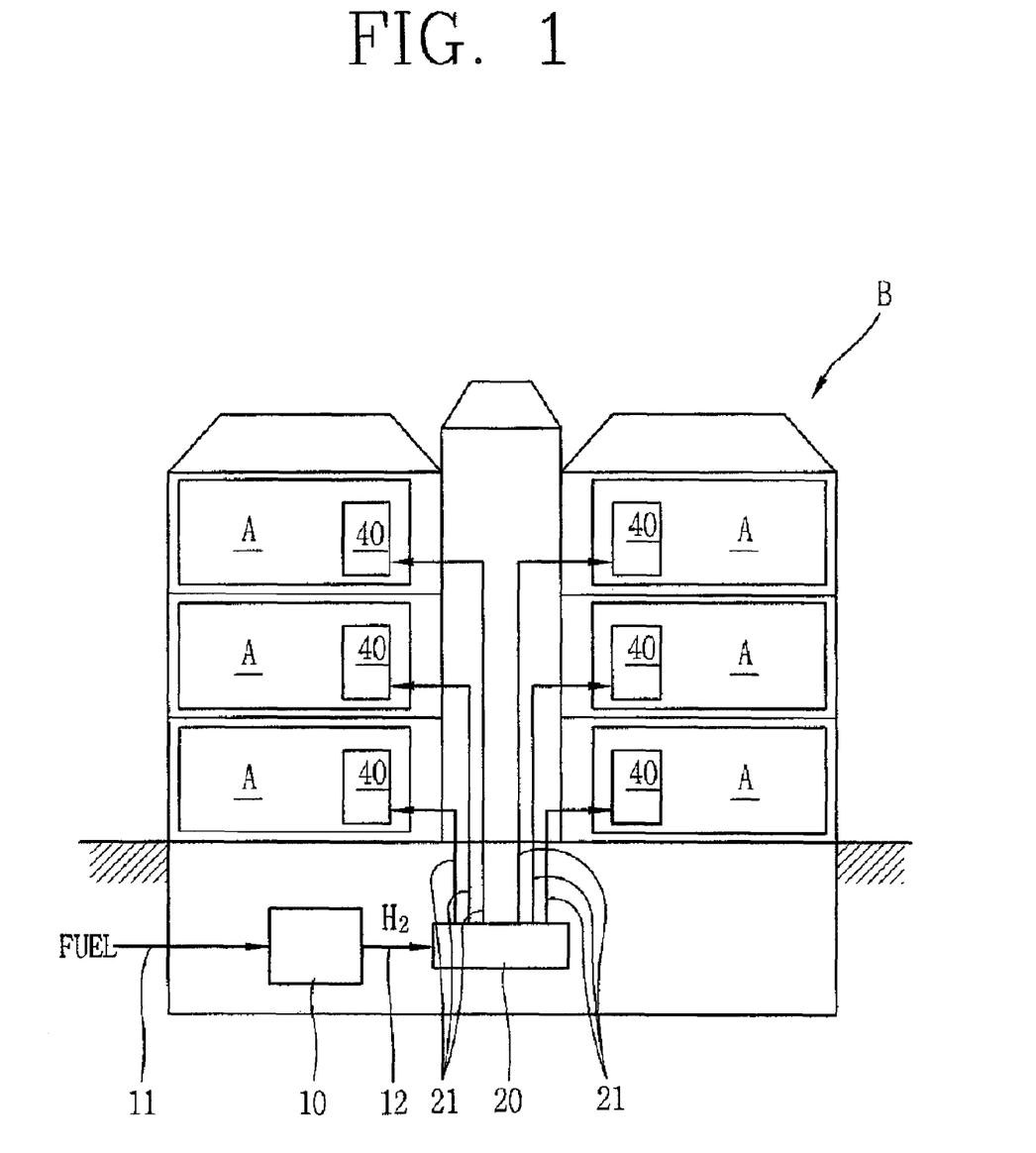
FIG. 1 discloses an example fuel cell system including multiple fuel cell units and one common-use reforming unit for supplying hydrogen to each of the fuel cell units.
Figure 2:
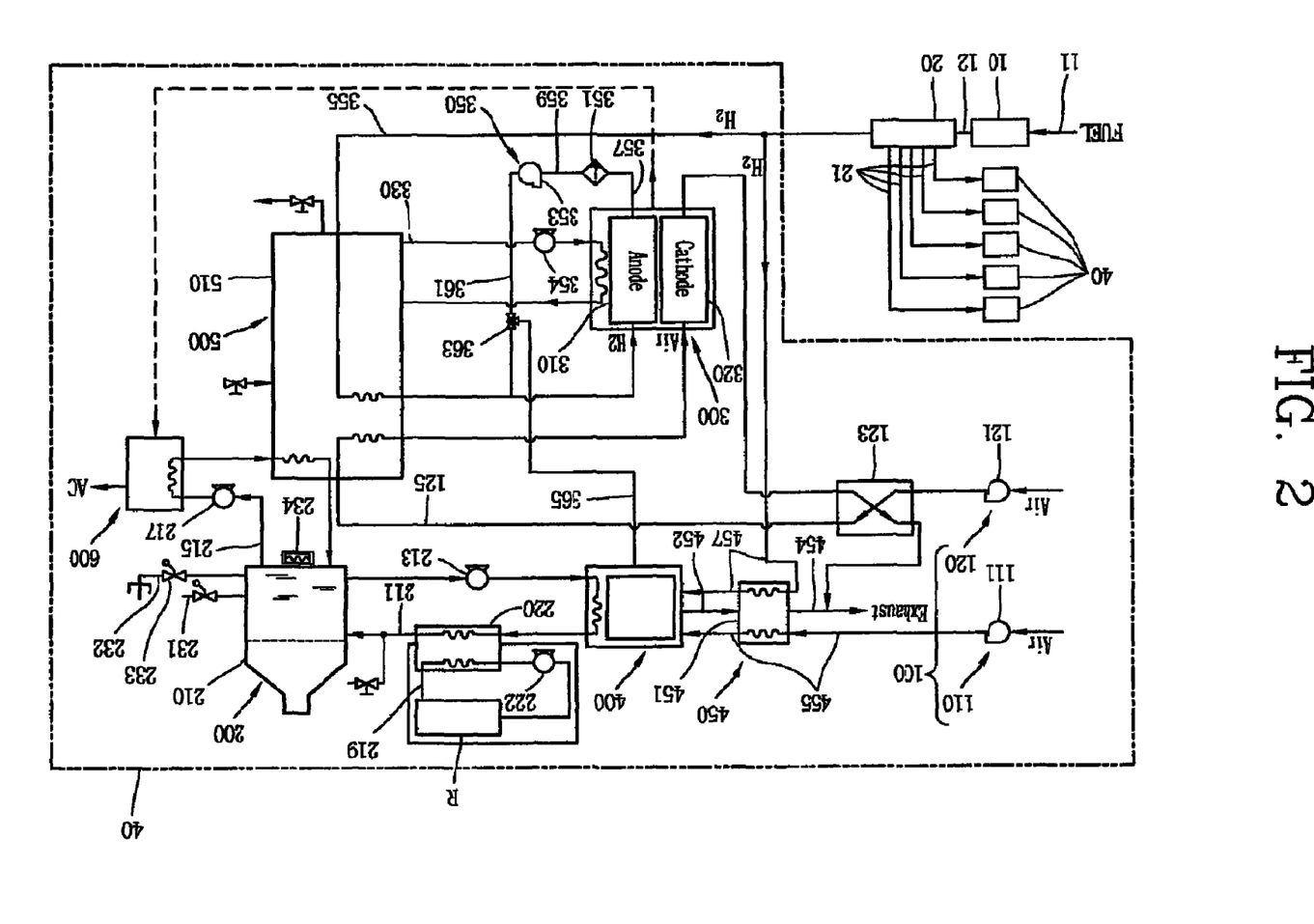
FIG. 2 discloses additional aspects of the fuel cell units of FIG. 1.

With reference now to FIGS. 1 and 2, one example of a fuel cell system is disclosed. The fuel cell system disclosed in FIGS. 1 and 2 includes a common-use reforming unit 10, a distributing unit 20, and multiple fuel cell units 40, each of which may be located in different physical locations. In one example implementation, the reforming unit 10 and the distributing unit 20 are located in the basement of an apartment building B. Each fuel cell unit 40 can then be located in respective apartment units, each denoted at A, of the apartment building B. In this example configuration, the installation of the common-use reforming unit 10 in the basement (or similar non-living space area) of the apartment building B reduces the space needed in the individual apartments A. Other locations for the common-use reforming unit 10, distributing unit 20, and fuel cell units 40 are also contemplated, for example depending on the configuration and/or energy needs of a particular residential or office building.

In operation, the common-use reforming unit 10 generates hydrogen from a hydrogen-rich fuel supplied through a fuel supplying pipe 11. The common-use reforming unit 10 refines the hydrogen-rich fuel by sequential processes of desulfurization, reforming reaction, and hydrogen refinement. The hydrogen-rich fuel can be any hydrocarbon-based fuel including, but not limited to, liquefied natural gas ("LNG"), liquified petroleum gas ("LPG"), and CH3PH.

With continuing reference to the example fuel cell system disclosed in FIGS. 1 and 2, a hydrogen supplying pipe 12 is provided between the common-use reforming unit 10 and the distributing unit 20. The hydrogen supplying pipe 12 supplies the hydrogen produced in the common-use reforming unit 10 to the distributing unit 20. The example fuel cell system also includes a plurality of distributing pipes 21. The distributing pipes 21 are provided between the distributing unit 20 and each fuel cell unit 40. The distributing unit 20 supplies hydrogen to each fuel cell unit 40 through the distributing pipes 21.

In one example embodiment, the distributing unit 20 supplies hydrogen to each fuel cell unit 40 under high-pressure. This high-pressure supplying of hydrogen enables reliable delivery of hydrogen to the fuel cell units 40 located in the units A, particularly where the units are located at points significantly above the distributing unit 20, such as might be the case in a high rise building. Supplying the hydrogen under high-pressure can also make the use of a fuel pump in conjunction with each distributing pipe 21 unnecessary.

The example fuel cell system disclosed in FIGS. 1 and 2 employs a single common-use reforming unit 10 to simultaneously produce the hydrogen for each of the fuel cell units 40. The common-use reforming unit 10 improves the efficiency of the example fuel cell system by mass generating hydrogen instead of requiring each fuel cell unit 40 to include its own reformer to generate its own hydrogen. Thus, each fuel cell unit 40 is smaller in physical size as compared to a fuel cell unit that includes its own reformer. Consequently, the space occupied by each fuel cell unit 40 in each unit A is decreased.

In addition, the efficiency of the fuel cell system disclosed in FIGS. 1 and 2 tends to be high due to a relatively constant use of electricity in the building B. For example, in a multi-tenant building of the sort designated in FIG. 1, there is typically a constant and ongoing use of electrical power. This allows the fuel cell system to operate in a consistent and ongoing manner; the minimization of any start-stop operation greatly enhances the operating efficiency of the overall system.

Figure 3:
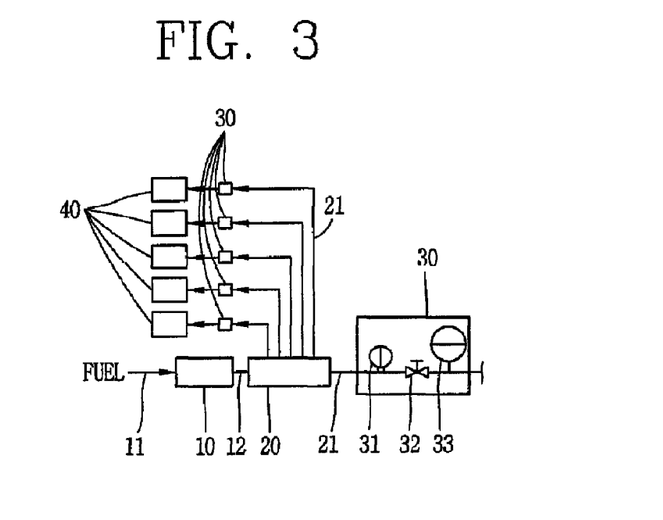
FIG. 3 discloses an example auxiliary distributing unit.

Turning now to FIG. 3, an example fuel cell system of the sort described in FIGS. 1 and 2 and further including a plurality of auxiliary distributing units 30 is disclosed. Each auxiliary distributing unit 30 is positioned on a distributing pipe 21 between the distributing unit 20 and a corresponding fuel cell unit 40. Each auxiliary distributing unit 30 functions to maintain the hydrogen flowing through the distributing pipe 21 at a constant pressure as the hydrogen is supplied to the fuel cell unit 40. In one embodiment, each auxiliary distributing unit 30 includes a regulator 31, a control valve 32, and a pressure measurer 33.

With reference again to FIG. 2, the various components included as part of an example fuel cell unit 40 will now be described. The fuel cell unit 40, according to one example implementation, includes an air supplying unit 100, a hot-water supplying unit 200, a stack unit 300, a re-circulating unit 350, an auxiliary heat supplying unit 400, a heat-rising unit 450, an integral heat-exchange unit 500, and an electrical output unit 600.

In operation, the air supplying unit 100 supplies air (or other oxygen-rich substance) to the stack unit 300. The stack unit 300 generates electricity by way of an electrochemical reaction between the hydrogen supplied from the common-use reforming unit 10 and the air supplied from the air supplying unit 100. The re-circulating unit 350 re-supplies any unused hydrogen discharged from the stack unit 300. The auxiliary heat supplying unit 400 generates heat by a catalytic reaction between air supplied from the air supplying unit 100 and hydrogen supplied from the common-use reforming unit 10 or hydrogen discharged from the stack unit 300. The auxiliary heat supplying unit 400 also selectively supplies heat to the hot-water supplying unit 200. The hot-water supplying unit 200 uses heat stored in the integral heat-exchange unit 500 to generate hot water. The heat-rising unit 450 heats the hydrogen supplied from the common-use reforming unit 10 to the auxiliary heat supplying unit 400. The heat-rising unit 450 also heats the air supplied from the air supplying unit 100 to the auxiliary heat supplying unit 400. The integral heat-exchange unit 500 cools the stack unit 300 by recovering the heat generated by the stack unit 300. The integral heat-exchange unit 500 then stores the recovered heat in order to subsequently heat the hydrogen and air supplied to the stack unit 300. The electrical output unit 600 converts the electricity produced in the stack unit 300 into form suitable for use as a utility power and supplies that electrical power for use within that unit A. It will be appreciated that this particular implementation is shown by way of example only, and that other configurations of a fuel cell unit might also be used depending on the needs of a particular situation. Following are additional details for the various components shown in FIG. 2.

In the example embodiment, the air supplying unit 100 includes a first air supplying unit 110 and a second air supplying unit 120. The first air supplying unit 110 includes a fan 111. The fan 111 supplies air to the auxiliary heat supplying unit 400 via a catalytic air line 455. The second air supplying unit 120 includes a fan 121. The fan 121 supplies air to the stack unit 300 via an air supplying line 125. The air supplying line 125 passes through a humidifier 123. The humidifier 123 humidifies the air flowing through the air supplying line 125.

The hot-water supplying unit 200 includes a hot-water storage tank 210, a first hot-water line 211, a first hot-water pump 213, a second hot-water line 215, a second hot-water pump 217, a heating line 219, a heat exchanger 220, a hot-water pump 222, a tap water line 231, a hot-water line 232, and a radiator 234.

The first hot-water line 211 runs from the hot-water storage tank 210, through the inside of the auxiliary heat supplying unit 400, through the heat exchanger 220, and back to the hot-water storage tank 210. The first hot-water pump 213 is positioned on the first hot-water line 211, and functions to circulate the hot water flowing through the first hot-water line 211.

The second hot-water line 215 runs from the hot-water storage tank 210, through the inside of the electrical output unit 600, through a heat-exchange module body 510 of the integral heat-exchange unit 500, and back to the hot water storage tank 210. The second hot-water pump 217 is positioned on the second hot-water line 215, and functions to circulate the hot water flowing through the second hot-water line 215.

With continued reference to the hot-water supplying unit 200, the tap water line 231 supplies tap water to the hot water storage tank 210. The hot-water line 232 supplies hot water stored in the water storage tank 210 can be used as a source of hot water in the unit A. For example, the user can operate a valve 233 positioned on the hot-water line 232 to control the flow of the hot water, or the hot-water line 232 might otherwise be integrated within the piping of the housing unit to distribute hot water throughout the unit. The radiator 234 is positioned under the hot-water storage tank 210. The radiator 234 can be used to prevent the temperature of the hot water stored in the hot-water storage tank 210 from rising above a predetermined threshold temperature.

In operation, the hot-water supplying unit 200 transmits the heat generated within the auxiliary heat supplying unit 400 and the heat of the electrical output unit 600 to the water stored in the hot-water storage tank 210. Simultaneously, the hot-water supplying unit 200 cools the auxiliary heat supplying unit 400 and the electrical output unit 600.

In a preferred implementation, the hot-water supplying unit 200 can be used as a source of heat for the unit A by using the heat of the hot water flowing through the first hot-water line 211. For example, a room, denoted at R in FIG. 2, can be a room located within the unit A in which the fuel cell unit 40 is installed, for example. This is accomplished by, for example, providing a radiant heat source, where the heating line 219 runs through the heat exchanger 220 and through certain portions of a floor, a ceiling and/or a wall of the room R. The heat exchange 220 facilitates the transfer of the heat of the hot water which flows through the first hot-water line 211 to the water which flows in the heating line 219. A hot-water pump 222 is positioned on the heating line 219. The hot-water pump 222 circulates the hot water through the heating line 219, thereby heating the portions of the floor, the ceiling, and/or the wall (or any suitable radiating surface) of the room R.

The stack unit 300 includes an anode 310 and a cathode 320. In operation, the anode 310 (also known as a fuel pole) is supplied with hydrogen and the cathode 320 (also known as an air pole) is supplied with air (or other oxygen containing substance). In greater detail, the hydrogen produced in the common-use reforming unit 10 is supplied to the anode 310 through the hydrogen supplying pipe 12, the distributing unit 20, the distributing pipe 21, and a first line 355. As discussed above in connection with FIG. 3, the hydrogen may also pass through an auxiliary distributing unit 30. The air provided from the second air supplying unit 120 of the air supplying unit 100 is supplied to the cathode 320 through the air supplying line 125 that passes through the humidifier 123.

The stack unit 300 generates electrical energy by an electrochemical reaction between the hydrogen supplied to the anode 310 and the air supplied to the cathode 320. A membrane electrode assembly ("MEA") (not shown) is positioned between the anode 310 and the cathode 320. The anode 310, cathode 320, and MEA may also be accompanied by a plurality of stacks units. Each of the plurality of stack units also includes an anode, a cathode, and an MEA provided therebetween.

The auxiliary heat supplying unit 400 generates heat that is used to heat the water flowing through the first hot-water line 211. The auxiliary heat supplying unit 400 generates the heat by reacting air supplied from the first air supplying unit 110 and hydrogen with a catalyst. The hydrogen used in this reaction can either be hydrogen supplied directly from the common-use reforming unit 10 or hydrogen discharged from the stack unit 300. For example, where heat for heating the water flowing through the first hot-water line 211 must be produced rapidly, the heat can be produced by using the hydrogen directly supplied from the common-use reforming unit 10. Alternatively, the auxiliary heat supplying unit 400 may be provided with other heating resources, for example, an electric burner or a gas burner, which can generate heat without using the catalyst.

The operation of the auxiliary heat supplying unit 400 can be selectively shut down within the fuel cell unit 40 so that all hydrogen within the fuel cell unit 40 is supplied to the stack unit 300 instead of a portion of the hydrogen within the fuel cell unit 40 being supplied to the auxiliary heat supplying unit 400. This shutting down of the auxiliary heat supplying unit 400 can result in increased generation of electricity by the stack unit 300 and decreased generation of heat being stored in the hot-water supplying unit 200. Operation might be dictated, for example, based on the power needs at any given time. For example, during the winter months a greater amount of heat might be desired, while in the summer months, there may be a higher demand for electrical power.

With continued reference to FIG. 2, the heat-rising unit 450 includes a heat-rising body 451, an exhaust gas inflow line 452, an exhaust gas discharging line 454, a catalytic air line 455, and a catalytic fuel line 457. The exhaust gas inflow line 452 connects the auxiliary heat supplying unit 400 to the heat-rising body 451 and allows exhaust gas discharged from the auxiliary heat supplying unit 400 to flow into the inside of the heat-rising body 451. The exhaust gas discharging line 454 allows the exhaust gas inside the heat-rising body 451 to be discharged from the heat-rising body 451. The catalytic air line 455 runs from the first air supplying unit 110, through the inside of the heat-rising body 451, and to the auxiliary heat supplying unit 400. The catalytic fuel line 457 runs through the inside of the heat-rising body 451 and to the auxiliary heat supplying unit 400. The catalytic fuel line 457 supplies the hydrogen generated by the common-use reforming unit 10 to the auxiliary heat supplying unit 400. The heat-rising unit 450 enables the heated exhaust gas discharged from the catalytic reaction in the auxiliary heat supplying unit 400 to be used to heat the hydrogen and the air supplied to the auxiliary heat supplying unit 400 through the catalytic fuel line 457 and the catalytic air line 455.

The re-circulating unit 350 includes a moisture remover 351, a fan 353, a first line 355, a second line 357, a third line 359, a fourth line 361, a three-directional valve 363, and a fifth line 365. The first line 355 connects the distributing pipe 21 with the stack unit 300 through the heat-exchange module body 510 of the integral heat-exchange unit 500. The second line 357 connects the stack unit 300 with the moisture remover 351. The third line 359 connects the moisture remover 351 with the fan 353. The fourth line 361 connects the fan 353 with the first line 355 through the three-directional valve 363. In operation, the fan 353 circulates the hydrogen discharged from the stack unit 300 through the second line 357, the moisture remover 351, the third line 357, and to the three-directional valve 363. The three-directional valve 363 then selectively supplies the hydrogen back to the stack unit 300 through the first line 355 or to the auxiliary heat supplying unit 400 through the fifth line 365. As the hydrogen passes through the moisture remover 351, the moisture remover 351 removes moisture from the hydrogen.

In one example embodiment, the fan 353 can be preconfigured to operate at a maximum speed as measured, for example, in revolutions per minute. The term "maximum speed" as used herein refers to the speed required in order to supply the amount of hydrogen required for maximum electricity generation in the stack unit 300. In addition, the distributing unit 20 can also be preconfigured to supply a sufficient quantity of hydrogen for maximum electricity generation in the stack unit 300. Further, irrespective of the amount of electricity generated in the stack unit 300, the fan 353 can be preconfigured to operate at the maximum speed.

Where the stack unit 300 discharges excessive amounts of unused hydrogen due to operating the fan 353 at the maximum speed, the hydrogen discharged from the stack unit 300 is re-supplied to the stack unit 300 through the circulating lines 357, 359, 361, and 355, thereby preventing a waste of any hydrogen. Operating the fan 353 at the maximum speed also serves to provide a thorough mix of the re-circulated hydrogen and the hydrogen supplied directly from the distributing unit 20 to the stack unit 300. Where the operating speed of the fan 353 is preconfigured, the need to employ a separate controller to control the speed of the fan 353 can be obviated. Operating the fan 353 at the maximum speed also results in the rapid removal of moisture from the hydrogen by the moisture remover 351, which also improves the efficiency of electricity generation in the stack unit 300.

Figure 5:
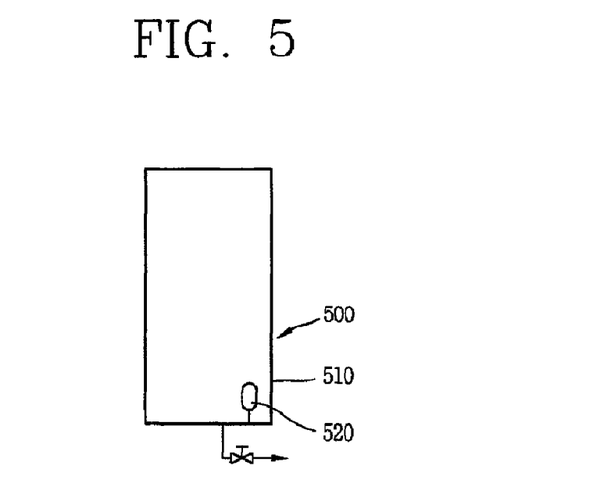
FIG. 5 discloses an example auxiliary heater positioned in an example heat-exchange module body.

With continuing reference to FIG. 2, and with reference also to FIG. 5, details of an example integral heat-exchange unit 500 will now be disclosed. The integral heat-exchange unit 500 includes a heat-exchange module body 510 and can include an auxiliary heater 520. The heat-exchange module body 510 stores deionized water. The auxiliary heater 520 is positioned inside the heat-exchange module body 510. The air supplying line 125 runs through the inside of the heat-exchange module body 510, as do the second hot-water line 215 and the first line 355. Also, the heat-exchange module body 510 is connected with a cooling-water line 330 that runs through the inside of the stack unit 300. The heat-exchange module body 510 sends cooling water through the cooling-water line 330 so as to cool the stack unit 300. A cooling-water pump 354 is positioned on the cooling-water line 300. The cooling-water pump 354 circulates the cooling water through the cooling-water line 300.

Figure 4:
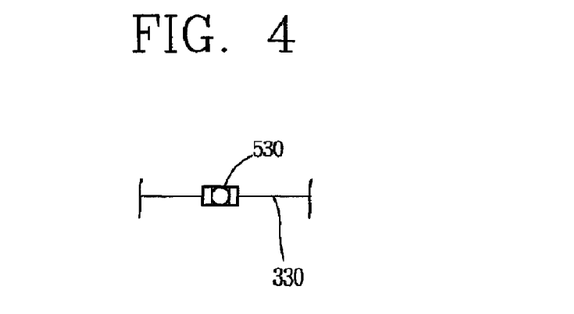
FIG. 4 discloses an example ion filter.

In one example embodiment, as disclosed in FIG. 4, an ion filter 530 may be positioned on the cooling-water line 330. The ion filter 530 maintains the low conductivity of the cooling water running through the cooling-water line 330.

With continuing reference to FIGS. 2 and 5, at least one auxiliary heater 520 may be included inside the heat-exchange module body 510. The at least one auxiliary heater 520 can be employed, for example, in a situation requiring the rapid heating of the cooling water within the heat-exchange module body 510 in order to rapidly raise the temperature of the stack unit 300, such as is required upon the initial operation of the stack unit 300. After the temperature of the stack unit 300 is raised appropriately, the auxiliary heater 520 can then be shut off.

The integral heat-exchange unit 500 thus facilitates the simultaneous cooling of the stack unit 300, heating of the hydrogen supplied to the anode 310, heating of the air supplied to the cathode 320, and heating of the hot water stored in the hot-water storage tank 210.

The electric output unit 600 converts the electricity generated in the stack unit 300 into a utility power. The electric output unit 600 then supplies the utility power to, for example, electrical outlets within the room R of the unit A. In one alternative embodiment, the electric output unit 600 may also be connected to an external electric supplying line (not shown). In this alternative embodiment the electric output unit 600 can serve as a conduit for external electricity supplied from, for example, a power plant in a conventional manner. This alternative embodiment allows the external electric supplying line to be used as backup source of electricity, for example, in each unit A.

Details regarding an example operation of the example fuel cell system disclosed in FIGS. 1-5 will now be disclosed. With particular reference first to FIG. 1, a fuel such as liquefied natural gas ("LNG") is supplied to the common-use reforming unit 10 through the fuel supplying pipe 11. As hydrogen is produced in the common-use reforming unit 10, the produced hydrogen is supplied to the distributing unit 20 through the hydrogen supplying pipe 12. The distributing unit 20 then distributes the hydrogen to each fuel cell unit 40 through the distributing pipes 21. In the example embodiment of FIG. 3, each distributing pipe 21 also passes through the auxiliary distributing unit 30. In either embodiment, the hydrogen is supplied to the stack unit 300 of the fuel cell unit system 40 through the first line 355.

With particular reference now to FIG. 2, the hydrogen is supplied through the first line 355 to the anode 310 of the stack unit 300, and the second air supplying unit 120 supplies air to the cathode 320 of the stack unit 300 through the air supplying line 125 that passes through the humidifier 123. Then, an electrochemical reaction between the hydrogen supplied to the anode 310 and the air supplied to the cathode 320 produces electrical energy, heat energy, and water.

The electrical energy produced in the stack unit 300 is then supplied to the electric output unit 300 where it is converted to a utility power and provided to an electrical outlet within the apartment A. In one alternative embodiment, external electricity provided from a power plant can also be supplied to the electric output unit 300 via an external power supplying line (not shown). The external power supplying line can serve as a backup source of electricity.

Continuing with the example operation of the fuel cell system, the integral heat-exchange unit 500 cools the stack unit 300 and heats the cooling water with the heat transmitted from the stack unit 300. This heating is accomplished as the heat produced in the stack unit 300 is transmitted to the cooling water which flows in the cooling-water line 330. Also, the hydrogen supplied to the anode 310 of the stack unit 300 through the first line 355 is heated as it passes through the inside of the integral heat-exchange unit 500. Further, the air supplied to the cathode 320 of the stack unit 300 though the air supplying line 125 is heated as it passes through the inside of the integral heat-exchange unit 500. In addition, the water that runs through the second hot-water line 215 of the hot-water supplying unit 200 is heated as it passes through the inside of the integral heat-exchange unit 500.

The hot water stored in the hot-water storage tank 210 can be accessed by a user through the hot-water line 232 as needed. Also, the room R of the unit A can be heated by the first hot-water line 211, the heat exchanger 220 and the heating line 219. The temperature of hot water running through the hot-water line 232 can be lowered by mixing the hot water with the tap water supplied from the tap water line 231, which can result in a corresponding lowering of the temperature of the room R.

If it becomes necessary to rapidly heat the water stored in the hot-water storage tank 210, the hydrogen of the common-use reforming unit 10 can be supplied directly to the auxiliary heat supplying unit 400 through the catalytic fuel line 457. The heat energy produced by the catalytic reaction between the supplied hydrogen and the air supplied from the first air-supplying unit 110 can then be used to heat the water which flows in the first hot-water line 211, resulting in the water stored in the hot-water storage tank 210 being heated rapidly.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalents of such metes and bounds are therefore intended to be embraced by the appended claims.

What is claimed is:

1. A fuel cell system comprising:
    a plurality of fuel cell units;
    a common-use reforming unit configured to supply hydrogen to the plurality of fuel cell units;
    each fuel cell unit comprising:
        a stack unit configured to generate electricity by an electrochemical reaction between air and the hydrogen supplied from the common-use reforming unit;
        an air supplying unit configured to supply the air to the stack unit;
        an integral heat exchange unit configured to cool the stack unit by recovering heat generated by the stack unit, the integral heat exchange unit also being configured to store the recovered heat;
        a hot-water supplying unit configured to receive the heat stored by the integral heat exchange unit, the hot-water supplying unit also being configured to provide heat and hot water external to the fuel cell unit;
        an auxiliary heat supplying unit configured to generate heat by reacting air supplied from the air supplying unit and hydrogen supplied from the common-use reforming unit or hydrogen discharged from the stack unit, the auxiliary heat supplying unit also being configured to selectively supply the generated heat to the hot-water supplying unit; and
        an electric output unit configured to convert the electricity generated in the stack unit into a utility power,
    wherein the integral heat exchange unit includes:
        a heat exchange module body connected with a cooling-water line which is configured to allow a cooling water to pass through the inside of the stack unit so as to cool the stack unit, and comprise a first line coupled from the common-use reforming unit to the stack unit, a second hot-water line connected from one portion of a hot-water storage tank to another portion of the hot-water storage tank through the inside of the electric output unit, and an air supplying line connected from the air supplying unit to the stack unit; and
        an auxiliary heater positioned inside the heat exchange module body.

2. The fuel cell system of claim 1, wherein the air supplying unit includes:
    a first air supplying unit including a fan configured to supply air to the auxiliary heat supplying unit;
    a second air supplying unit including a fan configured to supply air to the stack unit; and
    a humidifier configured to humidify the air supplied to the stack unit.

3. The fuel cell system of claim 2, wherein the integral heat exchange unit is configured to raise the temperature of the air and the hydrogen supplied to the stack unit.

4. The fuel cell system of claim 1, wherein an ion filter is positioned on the cooling-water line.

5. The fuel cell system of claim 1, further comprising a heat-rising unit configured to raise a temperature of the hydrogen supplied to the auxiliary heat supplying unit from the common-use reforming unit, and also configured to raise a temperature of the air supplied to the auxiliary heat supplying unit from the air supplying unit, using an exhaust gas discharged from the auxiliary heat supplying unit,
    wherein the heat-rising unit includes:
        a heat-rising body;
        an exhaust gas inflow line which connects the auxiliary heat supplying unit to the heat-rising body, the exhaust gas inflow line being configured to allow exhaust gas discharged from the auxiliary heat supplying unit to flow into the heat-rising body;
        an exhaust gas discharging line configured to allow the exhaust gas inside the heat-rising body to be discharged from the heat-rising body;
        a catalytic air line which runs from the air supplying unit, through the inside of the heat-rising body, to the auxiliary heat supplying unit; and
        a catalytic fuel line which runs through the inside of the heat-rising body to the auxiliary heat supplying unit.

6. The fuel cell system of claim 1, further comprising a re-circulating unit configured to re-supply any unused hydrogen discharged by the stack unit,
    wherein the re-circulating unit includes:
        a moisture remover configured to remove moisture from the hydrogen discharged by the stack unit;
        a fan configured to send the discharged hydrogen back to the stack unit; and
        a circulating line comprising:
            a first line which connects the common-use reforming unit to the stack unit;
            a second line which connects the stack unit to the moisture remover;

a third line which connects the moisture remover to the fan; and a fourth line which connects the fan to the first line.

7. The fuel cell system of claim 6, wherein the re-circulating unit further includes:

a three-directional valve positioned on the fourth line and configured to selectively supply the hydrogen discharged from the stack unit back to the stack unit or to the auxiliary heat supplying unit; and a fifth line which connects the three-directional valve with the auxiliary heat supplying unit.

8. The fuel cell system of claim 6, wherein the fan is preconfigured to operate at a maximum speed in order to supply the hydrogen required for maximum electricity generation in the stack unit.

9. A fuel cell system comprising:

a common-use reforming unit configured to supply hydrogen to a plurality of fuel cell units and a plurality of fuel cell units, each fuel cell unit comprising:

a stack unit configured to generate electricity by an electrochemical reaction between air and the hydrogen supplied from the common-use reforming unit;

an air supplying unit configured to supply the air to the stack unit;

an integral heat exchange unit configured to cool the stack unit by recovering heat generated by the stack unit, the integral heat exchange unit also being configured to store the recovered heat;

a hot-water supplying unit configured to receive the heat stored by the integral heat exchange unit, the hot-water supplying unit also being configured to provide heat and hot water external to the fuel cell unit;

an auxiliary heat supplying unit configured to generate heat by reacting air supplied from the air supplying unit and hydrogen supplied from the common-use reforming unit or hydrogen discharged from the stack unit, the auxiliary heat supplying unit also being configured to selectively supply the generated heat to the hot-water supplying unit; and an electric output unit configured to convert the electricity generated in the stack unit into a utility power, wherein the integral heat exchange unit includes:

a heat exchange module body connected with a cooling-water line which is configured to allow a cooling water to pass through the inside of the stack unit so as to cool the stack unit, and comprise a first line coupled from the common-use reforming unit to the stack unit, and an air supplying line connected from the air supplying unit to the stack unit; and an auxiliary heater positioned inside the heat exchange module body, and wherein the hot-water supplying unit includes:

a hot-water storage tank;

a first hot-water line which runs from one portion of the hot-water storage tank to another portion of the hot-water storage tank through the inside of the auxiliary heat supplying unit;

a first hot-water pump positioned on the first hot-water line and configured to circulate hot water through the first hot-water line;

a second hot-water line which runs from one portion of the hot-water storage tank to another portion of the hot-water storage tank through the inside of the electric output unit and the inside of the integral heat exchange unit; and a second hot-water pump which is positioned on the second hot-water line and configured to circulate hot water through the second hot-water line.

10. The fuel cell system of claim 9, wherein the hot-water supplying unit further includes a heat exchanger configured to transmit the heat of hot water flowing through the first hot-water line to water flowing through a heating line that runs through portions of a floor and/or a wall of a room.

11. A fuel cell system comprising:

a plurality of fuel cell units;

a common-use reforming unit configured to supply hydrogen to a plurality of fuel cell units;

each fuel cell unit comprising:

a stack unit configured to generate electricity by an electrochemical reaction between air and the hydrogen supplied from the common-use reforming unit;

an air supplying unit configured to supply the air to the stack unit;

an integral heat exchange unit configured to:

cool the stack unit by recovering heat generated by the stack unit;

store the recovered heat; and raise a temperature of the air and the hydrogen supplied to the stack unit using the stored heat; and a hot-water supplying unit configured to receive the heat stored by the integral heat exchange unit, the hot-water supplying unit also being configured to provide heat and hot water external to the fuel cell unit;

an auxiliary heat supplying unit configured to generate heat by reacting air supplied from the air supplying unit and hydrogen supplied from the common-use reforming unit or hydrogen discharged from the stack unit, the auxiliary heat supplying unit also being configured to selectively supply the generated heat to the hot-water supplying unit;

and an electric output unit configured to convert the electricity generated in the stack unit into a utility power, wherein the integral heat exchange unit includes;

a heat exchange module body connected with a cooling-water line which is configured to allow a cooling water to pass through the inside of the stack unit so as to cool the stack unit, and comprise a first line coupled from the common-use reforming unit to the stack unit, a second hot-water line connected from one portion of a hot-water storage tank to another portion of the hot-water storage tank through the inside of the electric output unit, and an air supplying line connected from the air supplying unit to the stack unit; and an auxiliary heater positioned inside the heat exchange module body.

12. The fuel cell system of claim 11, wherein the air supplying unit includes:

a first air supplying unit including a fan configured to supply air to the auxiliary heat supplying unit;

a second air supplying unit including a fan configured to supply air to the stack unit; and a humidifier configured to humidify the air supplied to the stack unit.

13. The fuel cell system of claim 11, wherein an ion filter is positioned on the cooling-water line.

14. The fuel cell system of claim 11, wherein the hot-water supplying unit includes:

a hot-water storage tank;

a first hot-water line which runs from one portion of the hot-water storage tank to another portion of the hot-water storage tank through the inside of the auxiliary heat supplying unit;

a first hot-water pump positioned on the first hot-water line and configured to circulate hot water through the first hot-water line;

a second hot-water line which runs from one portion of the hot-water storage tank to another portion of the hot-water storage tank through the inside of the electric output unit and the inside of the integral heat exchange unit; and a second hot-water pump which is positioned on the second hot-water line and configured to circulate hot water through the second hot-water line.

15. The fuel cell system of claim 14, wherein the hot-water supplying unit further includes a heat exchanger configured to transmit the heat of the hot water flowing through the first hot-water line to water flowing through a heating line that runs through portions of a floor and/or a wall of a room.

16. The fuel cell system of claim 11, wherein the heat-rising unit includes:

a heat-rising body;

an exhaust gas inflow line which connects the auxiliary heat supplying unit to the heat-rising body, the exhaust gas inflow line being configured to allow exhaust gas discharged from the auxiliary heat supplying unit to flow into the heat-rising body;

an exhaust gas discharging line configured to allow the exhaust gas inside the heat-rising body to be discharged from the heat-rising body;

a catalytic air line which runs from the air supplying unit, through the inside of the heat-rising body, to the auxiliary heat supplying unit; and a catalytic fuel line which runs through the inside of the heat-rising body to the auxiliary heat supplying unit.

17. The fuel cell system of claim 11, wherein the re-circulating unit includes:

a moisture remover configured to remove moisture from the hydrogen discharged by the stack unit;

a fan configured to send the discharged hydrogen back to the stack unit; and a circulating line comprising:

a first line which connects the common-use reforming unit to the stack unit;

a second line which connects the stack unit to the moisture remover;

a third line which connects the moisture remover to the fan; and a fourth line which connects the fan to the first line.

18. The fuel cell system of claim 17, wherein the re-circulating unit further includes:

a three-directional valve positioned on the fourth line and configured to selectively supply the hydrogen discharged from the stack unit back to the stack unit or to the auxiliary heat supplying unit; and a fifth line which connects the three-directional valve with the auxiliary heat supplying unit.

19. The fuel cell system of claim 11, wherein the fuel cell unit further comprises a heat-rising unit configured to raise a temperature of the hydrogen supplied to the auxiliary heat supplying unit from the common-use reforming unit, and also configured to raise a temperature of the air supplied to the auxiliary heat supplying unit from the air supplying unit, using an exhaust gas discharged from the auxiliary heat supplying unit.

20. The fuel cell system of claim 11, wherein the fuel cell unit further comprises a re-circulating unit configured to re-supply any unused hydrogen discharged by the stack unit.

* * * * *